United States Patent
Henry et al.

[11] Patent Number: 6,016,544
[45] Date of Patent: Jan. 18, 2000

[54] APPARATUS AND METHOD FOR TRACKING CHANGES IN ADDRESS SIZE AND FOR DIFFERENT SIZE RETRANSLATE SECOND INSTRUCTION WITH AN INDICATOR FROM ADDRESS SIZE

[75] Inventors: G. Glenn Henry; Terry Parks, both of Austin, Tex.

[73] Assignee: IP First LLC, Fremont, Calif.

[21] Appl. No.: 08/871,040

[22] Filed: Jun. 9, 1997

[51] Int. Cl.[7] .................................................. G06F 9/38
[52] U.S. Cl. .................... 712/234; 712/226; 712/202; 712/245
[58] Field of Search .................... 395/378, 581, 395/595, 562; 712/234, 226, 202, 245

[56] References Cited

U.S. PATENT DOCUMENTS

| | | | |
|---|---|---|---|
| 3,909,789 | 9/1975 | Holtey et al. | 395/595 |
| 4,524,416 | 6/1985 | Stanley et al. | 711/200 |
| 5,420,993 | 5/1995 | Smith et al. | 711/206 |
| 5,517,628 | 5/1996 | Morrison et al. | 395/581 |
| 5,630,082 | 5/1997 | Yao et al. | 395/389 |
| 5,634,046 | 5/1997 | Chatterjee et al. | 712/227 |
| 5,687,359 | 11/1997 | Smith, Sr. et al. | 395/563 |
| 5,692,167 | 11/1997 | Grochowski et al. | 712/226 |
| 5,796,973 | 8/1998 | Witt et al. | 395/384 |
| 5,895,497 | 4/1999 | Anderson et al. | 711/169 |
| 5,926,642 | 7/1999 | Favor | 712/1 |

*Primary Examiner*—Meng-Ai T. An
*Assistant Examiner*—Gautam R. Patel
*Attorney, Agent, or Firm*—James W. Huffman

[57] ABSTRACT

An apparatus and method for improving the execution speed of stack segment load operations is provided. Rather than delaying translation of instructions following stack segment loads, until the load is complete, the present invention presumes that no change will be made to the stack address size. Tracking of the stack address size, at the time of translation, is performed by a plurality of SAS bits associated with translated micro instructions, and logic is provided which compares the tracked SAS bits with any change in the stack address size. If no change is made by the stack load operation, the already translated instructions execute immediately. If a change is made by the stack load operation, logic interrupts processing of the translated instructions, and the instructions are retranslated using the new stack address size.

42 Claims, 7 Drawing Sheets

| AVL | AVAILABLE FOR USE BY SYSTEM SOFTWARE |
| --- | --- |
| BASE | SEGMENT BASE ADDRESS |
| D/B | DEFAULT OPERATION SIZE<br>(0 = 16-BIT SEGMENT; 1 = 32-BIT SEGMENT) |
| DPL | DESCRIPTOR PRIVILEGE LEVEL |
| G | GRANULARITY |
| LIMIT | SEGMENT LIMIT |
| P | SEGMENT PRESENT |
| S | DESCRIPTOR TYPE<br>(0 = SYSTEM; 1 = APPLICATION) |
| TYPE | SEGMENT TYPE |
| ▓ | RESERVED |

Pipeline flow for LSS followed by PUSH

| 614 Cycle | 602 Fetch | 604 Translator | 606 Register | 608 Address | 610 Data | 612 Write Back |
|---|---|---|---|---|---|---|
| 1 | LSS | X | X | X | X | X |
| 2 | PUSH | LSS | X | X | X | X |
| 3 | X | PUSH | LSS-1 | X | X | X |
| 4 | | X | LSS-2 | LSS-1 | X | X |
| 5 | | | LSS-3 | LSS-2 | LSS-1 | X |
| 6 | | | NOP | LSS-3 | LSS-2 | LSS-1 |
| 7 | | | NOP | NOP | LSS-3 | LSS-2 |
| 8 | | | NOP | NOP | NOP | LSS-3 |
| 9 | | | NOP | NOP | NOP | NOP |
| 10 | | | PUSH-1 | NOP | NOP | NOP |
| 11 | | | PUSH-2 | PUSH-1 | NOP | NOP |
| 12 | | | PUSH-3 | PUSH-2 | PUSH-1 | NOP |
| 13 | | | X | PUSH-3 | PUSH-2 | PUSH-1 |
| 14 | | | | X | PUSH-3 | PUSH-2 |
| 15 | | | | | X | PUSH-3 |
| 16 | | | | | | X |

FIG. 8

Pipeline flow for LSS followed by PUSH

| 814 Cycle | 802 Fetch | 804 Translator | 806 Register | 808 Address | 810 Data | 812 Write Back |
|---|---|---|---|---|---|---|
| 1 | LSS | X | X | X | X | X |
| 2 | PUSH | LSS | X | X | X | X |
| 3 | X | PUSH | LSS-1 | X | X | X |
| 4 |  | X | LSS-2 | LSS-1 | X | X |
| 5 |  |  | LSS-3 | LSS-2 | LSS-1 | X |
| 6 |  |  | JMP.SAS | LSS-3 | LSS-2 | LSS-1 |
| 7 |  |  | PUSH-1 | JMP.SAS | LSS-3 | LSS-2 |
| 8 |  |  | PUSH-2 | PUSH-1 | JMP.SAS | LSS-3 |
| 9 |  |  | PUSH-3 | PUSH-2 | PUSH-1 | JMP.SAS |
| 10 |  |  | X | PUSH-3 | PUSH-2 | PUSH-1 |
| 11 |  |  |  | X | PUSH-3 | PUSH-2 |
| 12 |  |  |  |  | X | PUSH-3 |
| 13 |  |  |  |  |  | X |

APPARATUS AND METHOD FOR TRACKING CHANGES IN ADDRESS SIZE AND FOR DIFFERENT SIZE RETRANSLATE SECOND INSTRUCTION WITH AN INDICATOR FROM ADDRESS SIZE

BACKGROUND OF THE INVENTION

1. Field of the Invention

This invention relates in general to the field of memory segments, and more particularly to an improved method and apparatus for loading a stack segment register.

2. Description of the Related Art

Segmentation is a memory management and protection mechanism that separates memory within a computer system into a number of different memory segments and supervises access to each of the segments. Segmentation is used to give computer programs their own independent and protected memory spaces. For example, the separate memory spaces can prevent one program from writing into a memory space that is in use by another program. In addition, segmentation provides access control to each memory segment to prohibit programs from accessing memory segments for which they are not authorized.

To reference a memory segment, a segment register is designated by a processor instruction. Within the segment register is a "selector" which acts as an index into a descriptor table. The descriptor table is an array of "descriptors", each of which contain information relating to a particular memory segment. A descriptor includes a limit field that defines the size of the memory segment, a base address for the segment, and other access or control information. When a selector is loaded into a segment register, the descriptor that it references is also loaded into a "hidden" portion of the segment register. Future access to memory locations within the memory segment are then made by designating a segment register within a processor instruction, and providing an offset from the base address of the memory segment.

One particular memory segment that is commonly used is a stack segment. A stack segment, or simply a "stack", is an area of memory that is used by a processor to temporarily store information, and then provide the information back to the processor in reverse order. Most often, information is "pushed" onto the stack, and later "popped" off the stack in a last-in/first-out (LIFO) order.

Within an x86 processor, a stack segment is designated by loading a stack segment register (SS) with a selector/descriptor combination that defines the stack segment. The base address, limit, and access/control information for the stack segment are later referenced by using the SS segment register within a processor instruction (or by using a processor instruction that references the SS register implicitly). A second register, the ESP register, is used to temporarily store an offset from the base address.

An example of an instruction that utilizes the "stack" memory segment is PUSH. This instruction decrements the stack pointer, contained in the ESP register, and then places the designated operand into the memory location defined by adding the base address for the stack (i.e., the base address stored in the descriptor loaded in the hidden portion of the SS register) to the stack pointer (loaded in the ESP register). To retrieve this operand off of the top of the stack, a similar instruction POP is used. This instruction retrieves the operand located at the memory address defined by adding the base address to the stack pointer. After the memory retrieval is performed, the ESP register is incremented.

As mentioned above, within a stack segment descriptor, there exists a base address, a limit, and certain access attributes that define the memory segment. One of the access attributes is called the D/B bit. If the segment defined by the descriptor is a code segment, the bit is called the D bit, and indicates the default length for operands and effective addresses. In x86 processors, the default length can be set to either 32-bit operands or 16-bit operands. In a data segment, this bit is called the B bit, and it controls whether stack operations utilize a 32-bit ESP register, or a 16-bit SP register. If the bit is set, i.e., B=1, then pushes, pops and calls use a 32-bit ESP register. If, on the other hand, the B-bit is cleared, B=0, then the 16-bit SP register is used.

From the above, it should be clear that before any stack operation occurs, whether a push, pop or call, the SS register must first load the selector/descriptor combination which defines the stack segment of interest, and the contents of the B-bit must be known, to allow the processor to understand whether stack address size is to be 32-bit or 16-bit, before the operation is executed. This is well known in the art.

However, a problem exists in requiring the processor to know the bit size for stack operations prior to execution of a stack instruction. This is especially true when a stack instruction, such as a push, pop or call, is executed immediately following an instruction which loads the SS segment register (e.g., LSS). The problem is that when a processor loads the SS segment register with the selector/descriptor, the content of the B-bit is not known until the load instruction is completed. If the instruction following the load is a stack instruction, it cannot begin execution until the processor knows the contents of the B-bit, because it does not know whether the stack operation is a 16-bit or 32-bit operation. Thus, it cannot begin execution until the load instruction has completed. This situation is unfortunate in modern processors where multiple instructions are in various stages of execution at any one time. Requiring a second instruction to await the complete execution of a first instruction, before it can begin, adds costly processing delay to the processor, affecting the overall program speed of the processor.

For example, in a Pentium processor it typically takes 3 processor clock cycles out of the processor pipeline to execute a segment register load instruction. However, when loading the SS stack segment register, the Pentium processor requires at least 7 processor clock cycles. It is believed that the extra 4 clock cycles which are required by the LSS instruction is for the purpose of preventing any following instruction from beginning execution until the LSS has completed execution, i.e., until the contents of the B-bit have been determined, and provided to the processor.

However, adding 4 no operation (NOP) clock cycles to an instruction that really takes 3 clock cycles to execute, just to insure that a following stack instruction doesn't begin with an incorrect bit size (16 or 32), adds unnecessary delay to stack segment loads, as well as to stack operations which follow stack segment loads. Moreover, in much of the software that is written today, it is presumed that stack operations are 32-bit. But, just to insure compatibility with older 16-bit designs, every stack segment load operation incurs this unnecessary delay.

What is needed is an apparatus and method that reduces, or eliminates the delays associated with stack segment loads, while still insuring that stack operations can be executed which are 16-bit or 32-bit. More specifically, what is needed is a method and apparatus which allows a stack instruction such as a push, pop or call, to begin execution, without waiting for the completion of a stack segment load operation, but which still allows changes in the B-bit to immediately affect following stack instructions.

To address the above-detailed deficiencies, it is an object of the present invention to provide an improved method and apparatus for loading a stack segment register.

More specifically, it is an object of the present invention to improve the load time of a load stack segment macro instruction by translating a second instruction following the load stack segment instruction, and providing the translated instruction immediately behind the load stack segment instruction, without any intermediate "holes" or "bubbles" in the pipeline. Then, the translated second instruction is tracked, before execution, to determine whether the load stack segment instruction modifies the bit size for stack operations from 32-bit to 16-bit. If a modification is made by the load stack segment instruction, the intermediate translated instructions are ignored, and the second instruction is retranslated utilizing the new bit size for stack operations.

Accordingly, in the attainment of the aforementioned objects, it is a feature of the present invention to provide an apparatus for loading a stack segment register within a pipeline processor. The apparatus includes a translator, a register file, stack address size logic, stack size tracking logic, and determination logic. The translator is located within a translate stage of the pipeline processor, and translates a first macro instruction into a first sequence of micro instructions, and a second macro instruction into a second sequence of micro instructions. The register file, is connected to the translator, and further includes a stack segment register. The stack segment register stores a descriptor which indicates whether stack operations are of a first bit size or of a second bit size. The stack address size logic is connected to the register file, and to the translator, and provide an indicator to the translator that current stack operations are either of the first bit size or of the second bit size. The stack size tracking logic is connected to the translator, and associated with the second sequence of micro instructions, following the first sequence of micro instructions in the pipeline processor. Associated, in this context, indicates that the tracking logic follows or tracks the micro instructions down the pipeline, in processing stages after the translate stage. The tracking logic tracks whether stack operations were of the first bit size or of the second bit size at the time the second sequence of micro instructions were translated. The determination logic is connected to the stack size tracking logic, and to the stack address size logic, and determines whether the current stack operations and the tracked stack operations are both of the first bit size or of the second bit size, and if not of the same size, provides a signal to the processor to ignore the second sequence of micro instructions, and to retranslate the second macro instruction using the indicator from the stack address size logic.

An advantage of the present invention is that intermediate NOP's which are customarily inserted between the load stack macro instruction and the second macro instruction are eliminated, thus improving the effective load time for loading a stack segment register.

In another aspect, it is a feature of the present invention to provide a tracking mechanism, within a pipeline microprocessor, utilized for micro instructions that follow a stack segment register load. The tracking mechanism includes a plurality of pipeline stages, a stack address size signal line, a plurality of instruction registers, a plurality of stack address size bits, and logic circuitry. The plurality of pipeline stages within the pipeline microprocessor further includes a translate stage that translates macro instructions into micro instruction sequences. The stack address size signal line transmits an indicator signal to the translate stage, from a source thereof, which indicates whether stack operations are to utilize a 16-bit or a 32-bit stack address size (SAS). Each of the plurality of instruction registers are connected to one of the plurality of pipeline stages such that each one of the plurality of pipeline stages has an associated one of the plurality of instruction registers. The plurality of instruction registers temporarily store micro instructions as they proceed through the pipeline microprocessor. The plurality of stack address size bits are connected to one of the plurality of pipeline stages, and associated with one of the plurality of instruction registers, and temporarily store the value of the SAS indicator at the time the micro instruction in the associated instruction register was translated. The logic circuitry is connected to the stack address signal line, and to at least one of the plurality of stack address size bits, to determine whether the SAS indicator, stored in the plurality of address size bits, is the same as the SAS signal on the stack address signal line, and provides a signal to the pipeline microprocessor to continue processing micro instructions within the plurality of pipeline stages, or to discontinue processing the micro instructions within the plurality of pipeline stages, and to retranslate the micro instructions whose associated stack address size bit is not the same as the SAS signal on the stack address signal line.

In yet another aspect, it is a feature of the present invention to provide a method for loading a stack segment register within a pipeline microprocessor. The method includes providing a stack address size (SAS) signal which indicates the current bit size for stack operations, translating a load stack segment macro instruction into a first sequence of micro instructions, providing the first sequence of micro instructions to pipeline stages within the pipeline microprocessor, translating a second macro instruction into a second sequence of micro instructions, storing a stack address size (SAS) indicator along with at least one of the micro instructions within the second sequence, the indicator indicating the bit size for stack operations at the time the second macro instruction was translated, monitoring the SAS signal, and the SAS indicator, to determine whether, prior to executing the micro instructions within the second sequence, the bit size for stack operations has changed since the micro instructions were translated, and if prior to executing the micro instructions within the second sequence, the bit size for stack operations has changed, then disabling execution of the micro instructions within the second sequence, and retranslating the second macro instruction.

And advantage of the present invention is that instructions which follow a load stack segment instruction need not be delayed for the purpose of insuring that stack operation size is not changed by the preceding instruction, after they are translated, but before they are executed.

BRIEF DESCRIPTION OF THE DRAWINGS

These and other objects, features, and advantages of the present invention will become better understood with regard to the following description, and accompanying drawings where:

FIG. 8 is a pipeline flow diagram illustrating the instruction sequence for loading a stack segment register, according to the present invention.

DETAILED DESCRIPTION

Figure 1:
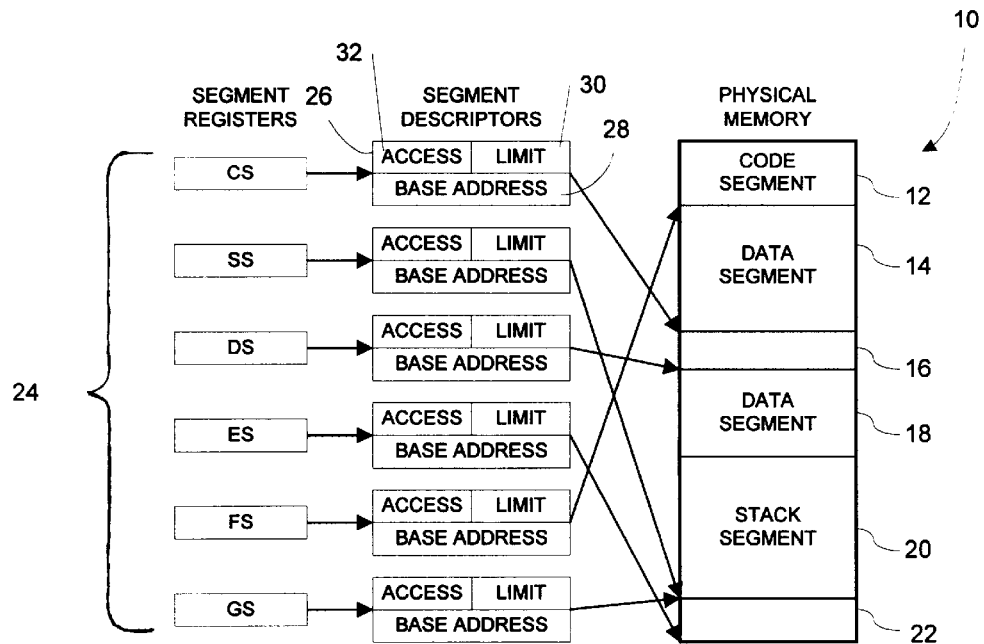
FIG. 1 is a block diagram illustrating a segmented memory model.

Referring to FIG. 1 of the drawings, a multi-segment memory model is provided. A physical memory 10 is shown divided up into a number of memory segments 12, 14, 16, 18, 20 and 22. For example, the physical memory 10 may be contain a code segment 12, data segments 14, 18, and a stack segment 20. Each of these segments can be from 1 byte to 4 Gbytes long and can have different access rights, depending on the design of the programmer. The memory segments are referenced by segment descriptors 26. Each of the segment descriptors 26 contain a base address 28, a limit 30, and access/control bits 32. The base address 28 defines the starting point for the memory segment. To locate a particular memory location within a memory segment, and offset is generally provided which is added to the base address 28. The limit 30 defines the maximum size of the memory segment. And, the access/control bits 32 define particular attributes of the memory segment, to be further described below, with reference to FIG. 3.

The segment descriptors 26 are stored in a "hidden" register that is associated with each of the segment registers 24. Thus, when a selector is loaded into one of the segment registers 24, its associated descriptor is loaded into a hidden descriptor register. This is illustrated in FIG. 2.

Figure 2:
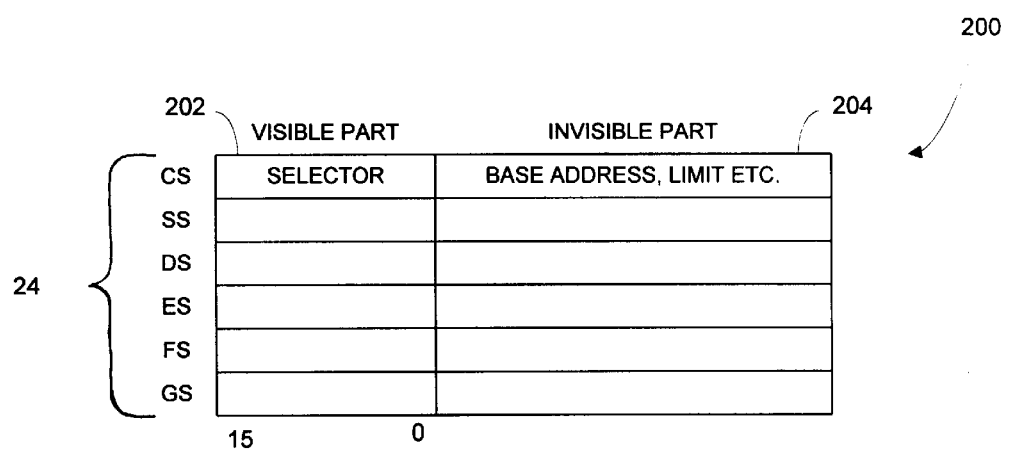
FIG. 2 illustrates the selector and descriptor for x86 segment registers.

FIG. 2 shows a segment register portion 200 of a register file within an x86 compatible microprocessor. The segment register portion contains the segment registers 24 shown in FIG. 1. The segment registers 24 each contain a visible part 202 for storing a selector, and an invisible part 204 for storing a descriptor. One skilled in the art should appreciate that the terms visible and invisible apply only to a programmer's ability to directly reference the register. Direct reference may be made to the visible part of a segment register 24, but the descriptor is only referenced indirectly, by referencing its associated selector.

Figure 3:
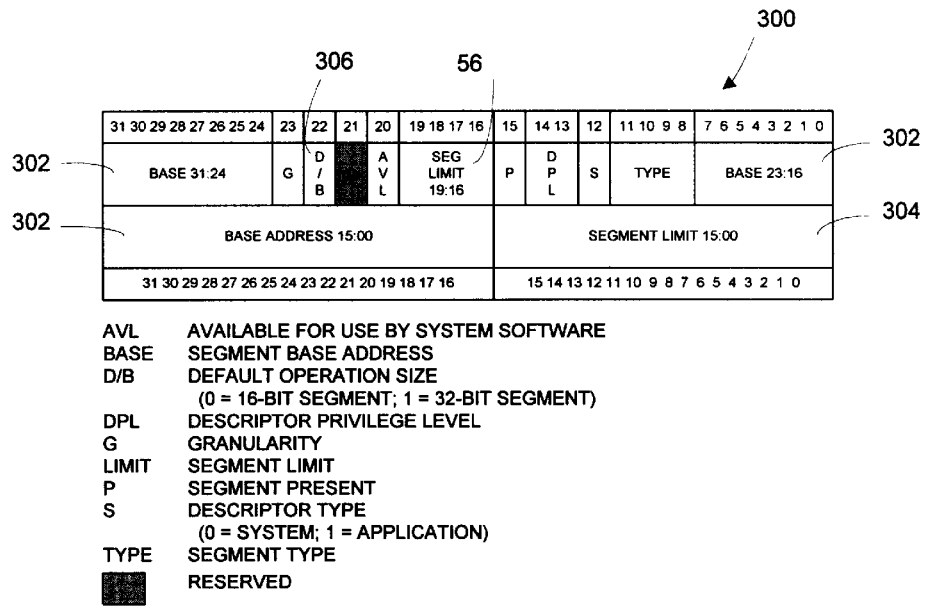
FIG. 3 is a block diagram of a descriptor.

Now referring to FIG. 3, a map of a descriptor 300 is shown. The descriptor 300 is a data structure in memory that provides a processor with the size and location of a memory segment, as well as control and status information. The descriptor 300 contains a 32-bit base 302 that defines the base address for the memory segment, and a 20-bit limit field 304 which defines the size of the memory segment. Additional fields are provided that specify the segment type (e.g., read-only, execute only, etc.), the privilege level, and whether the segment is present in memory. In addition, a D/B field 306 is provided. The D/B field 306 indicates the default length for operands and effective addresses if the descriptor refers to a code segment (D=1 indicates 32-bit operands, D=0 indicates 16-bit operands), and if the descriptor refers to a data segment, the D/B field 306 controls the size of stack operations. If B=1, then stack operations such as pushes, pops or calls, use the 32-bit ESP register. If B=0, then stack operations use the 16-bit SP register.

Figure 4:
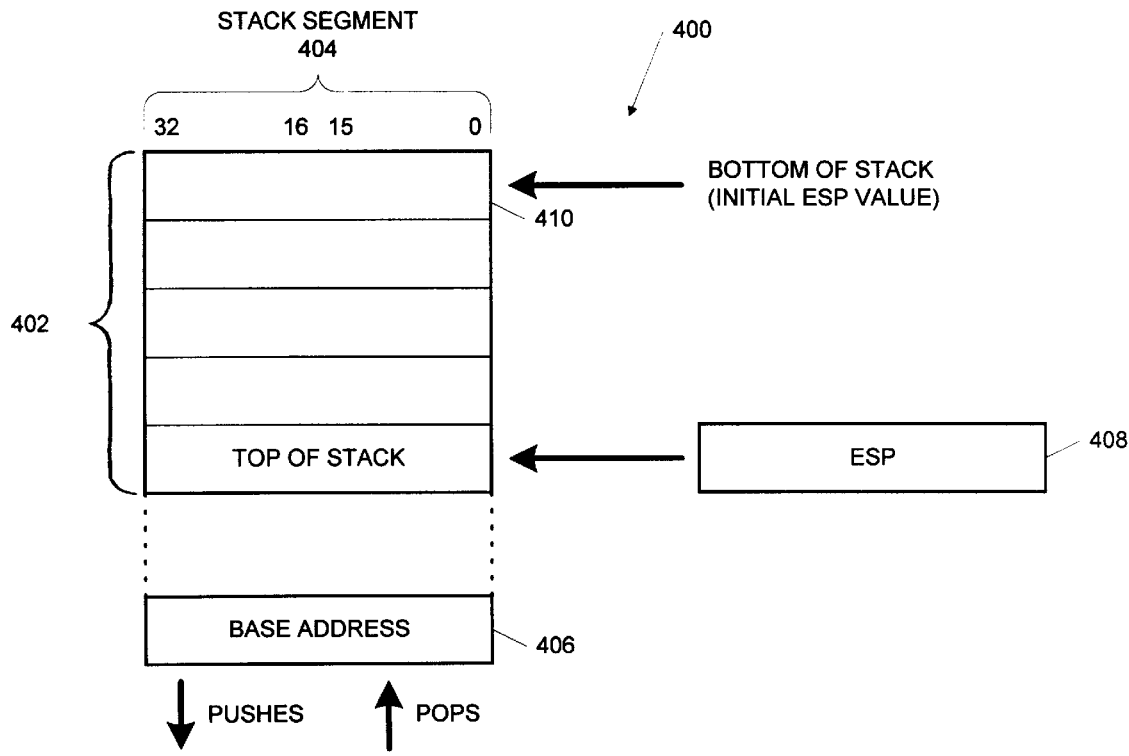
FIG. 4 is a block diagram of a memory stack illustrating 16 and 32-bit stack operations.

Now referring to FIG. 4, a portion of a stack memory segment 400 is shown. The segment 400 shows a plurality of 32-bit memory locations that are further divided in half to form pairs of 16-bit words 404. When the SS segment register is loaded, an associated descriptor that contains the base address 406 for the stack segment 400 is stored in the hidden segment register. In addition, the stack pointer register (ESP) 408 is initialized to point to the bottom of the stack 410. When PUSH operations are executed, operands are placed into the memory locations 402, and the ESP is decremented so that it continually points to the top of the stack. When POP operations are executed, operands are retrieved from the memory locations 402, and the ESP is incremented.

As mentioned briefly above, prior to executing a particular stack operation, the contents of the B bit must be known, to properly locate the memory location within the stack, if data is to be stored or retrieved accurately. This will be better understood by illustrating how a load stack register instruction (LSS), followed by a PUSH operation, is executed within a pipeline processor.

Figure 5:
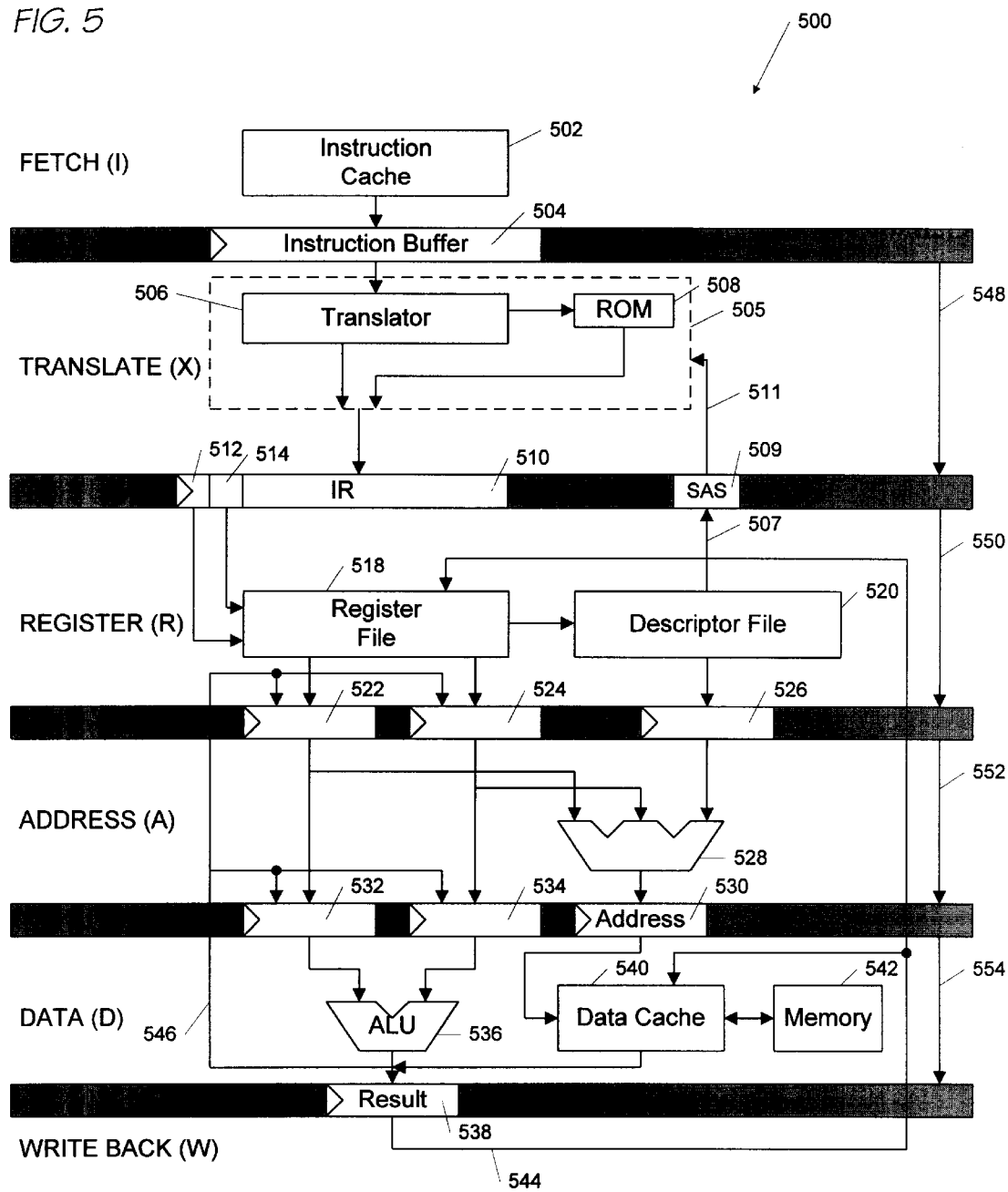
FIG. 5 is a block diagram of a pipeline processor that can incorporate the apparatus and method of the present invention.

Now referring to FIG. 5, a portion of a pipeline processor 500 is provided. Before tracing the LSS and PUSH instructions, a brief overview of the processor 500 is provided. In FIG. 5 a pipeline processor 500 is shown. The processor 500 has a six stage pipeline, with the stages including: Fetch; Translator; Register; Address; Data; and Write Back. During the fetch stage, the processor 500 sends out a value in the program counter (not shown) to fetch the next macro instruction from an instruction cache 502 and places the macro instruction into an instruction buffer 504. On such macro instruction would include either of the LSS (load SS segment register) or PUSH. The instruction buffer 504 holds the macro instruction that will be needed in subsequent clock cycles. Other buffers, registers, etc. may be placed between the fetch stage and the translate/decode stage, or between other stages in the processor 500, as required. However, for ease of illustration, only specific buffers and registers have been called out.

The translate/decode stage reads the macro instruction located in the instruction buffer 504 and provides it to a translate/decode logic block 505. The translate/decode logic block 505 includes a translator 506, and a control ROM 508. The translator 506 decodes the macro instruction into a sequence of micro instructions, and provides the micro instructions, one at a time, to an instruction register 510. Depending on the complexity of the macro instruction, and the goals of the designer, the micro instruction sequence may be provided either directly by the translator 506, by the control ROM 508, or by a combination of both.

As shown, the instruction register 510 contains a couple of sections 512, 514 which may be used to store information relating to operands upon which the micro instructions will operate. These sections are provided to a register file 518 and to a descriptor register file 520 during the register stage of the pipeline. The contents of sections 512, 514 access specific registers in the register file 518 and select the contents of those registers to be output into two temporary registers 522, 524 for use in later clock cycles. In addition, if one of the operands designated within the temporary registers 522, 524 indicates that a segment register is to be retrieved from the register file, the base address of the associated descriptor is provided by the descriptor file 520, and placed into the temporary register 526. For example, the base address of a stack segment may be placed into temporary register 526 if the SS segment register has been designated within the instruction register 510.

In addition to providing the base address of a selected descriptor, the descriptor file 520 also provides a stack address size (SAS) signal, on signal line 507, to an SAS temporary buffer 509. The contents of the SAS buffer 509 are provided directly to the translate/decode block 505, via signal line 511 for use in translating macro instructions. More specifically, the contents of the B-bit within the descriptor associated with the SS segment register determine whether stack operations are to be of a first size, i.e., 32-bits, or of a second size, i.e., 16-bits. And, as indicated above, the processor 500 must know whether stack operations are of a first size, or a second size, prior to translating stack instructions. So, the contents of the B-bit are continuously forwarded to the translate/decode logic 505 from the descriptor file 520.

When a micro instruction requires access to a memory location, either for Load or Store operations, the address stage calculates the effective address. The address is calculated by providing the contents of registers 522, 524, and 526 as inputs to an ALU circuit 528. However, if the stack address size (SAS) is 16-bits, the upper 16-bits of the effective address are zeroed before adding to the segment base to form the linear address. The ALU circuit 528 selects appropriate inputs, and stores the effective address in an address register 530. For micro instructions which do not require calculation of a linear address, the contents of registers 522, 524 are forwarded directly to temporary registers 532, 534 for use in later stages.

During the data stage, one of two operations occurs. The first operation provides the contents of the registers 532, 534 as inputs to an ALU 536 for operation thereon. The result of the operation is placed in a result register 538. A second operation occurs when the micro instruction is not an ALU operation, but rather a Load or Store operation from memory. In this instance, the address in register 530 is provided as input to a data cache 540 to load data therefrom. If the operation is a Load, the data in the data cache 540 is placed in the result register 538. If the data does not reside in the data cache 540, the cache 540 accesses a memory 542, retrieves the requested data, and places the data in the result register 538.

During the write back stage, the contents of the result register 538 are written into either the data cache 540 (if a store operation), or the register file 518 (if a LOAD or ALU operation), via signal line 544. Prior to the write back stage, however, the output of the ALU 536 or the data cache 540 are provided on a forward/bypass bus as possible inputs to temporary registers 522, 524, 532, or 534, for use in subsequent processor cycles. Use of the forward/bypass bus allows the contents of the result register 538 to be used as an input to either the ALU circuit 528, or the ALU 536 on the next processor cycle.

In addition to the buffers and registers called out in FIG. 5, other information relating to micro instructions may be passed from stage to stage along buses 548, 550, 552 and 554. Thus, FIG. 5 shows how an instruction flows through the data path of the pipeline processor 500. At the end of each clock cycle, every value computed during that clock cycle and required on a later clock cycle is written into a storage device, which may be a memory 542, a register file 518, or a temporary register.

Figure 6:
FIG. 6 is a pipeline flow diagram illustrating the method according to the prior art for loading a stack segment register.

With the above operational background of the processor 500, program flow of an LSS macro instruction, followed by a PUSH macro instruction will now be provided with reference to FIG. 6 to illustrate the delay which arises when an instruction modifies the stack address size.

A pipeline flow diagram 600 is provided in FIG. 6 that contains the pipeline stages: Fetch 602; Translator 604; Register 606; Address 608; Data 610; and Write Back 612, as described for the processor 500. In addition, a clock cycle column 614 is provided to provide timing and instruction progression.

Beginning at clock cycle 1, an LSS macro instruction is fetched from the instruction cache 502, and placed within the instruction buffer 504.

During clock cycle 2, the translator stage decodes the LSS macro instruction into a sequence of micro instructions which implement the LSS macro instruction, and provides the first micro instruction of the sequence to the instruction register 510. One skilled in the art will appreciate that for each macro instruction, a sequence of micro instructions are typically required to perform the requested operation. For simplicity, micro instruction sequences for the LSS and PUSH macro instructions have been limited to 3 instructions, and the opcodes for the instructions have been designated with the their macro instruction opcode prefix, e.g., LSS-1, LSS-2, LSS-3, etc. In addtion, the PUSH macro instruction is fetched from the instruction cache 502 and placed within the instruction buffer 504.

During clock cycle 3, the LSS-1 micro instruction proceeds through the register stage. In addition, the LSS-2 micro instruction is provided by the translator to the instruction register 510. It should be understood, for purposes of this illustration, that the translate/decode block 505 does not begin translation of the PUSH macro instruction, located within the instruction buffer 504, until all micro instructions associated with the LSS sequence have been provided to the instruction register 510.

During clock cycle 4, the LSS-1 micro instruction proceeds through the address stage of the pipeline, the LSS-2 micro instruction proceeds through the register stage of the pipeline, and the LSS-3 micro instruction is provided by the translator to the instruction register 510. Thus, by the end of clock cycle 4, all micro instructions required to implement the LSS operation have been provided by the translator to the processor for execution. However, it should be appreciated that until the LSS-3 micro instruction has passed through the write back stage (or at least through the data stage), the contents of the SS segment register, including its associated descriptor, will not be changed.

During clock cycle 5, the LSS-1 micro instruction proceeds through the data stage, the LSS-2 micro instruction proceeds through the address stage, and the LSS-3 micro instruction proceeds through the register stage. At this point, the translate/decode block 505 should provide the first micro instruction in the PUSH sequence to the instruction register 510. However, if it were allowed to do so, it could potentially provide errant instructions to the processor 500.

For example, if prior to executing the LSS macro instruction, presume that the descriptor pertaining to the SS segment register contains a B-bit which is set (B=1) indicating that stack operations are to be 32-bit. The status of the B-bit is continuously provided by the descriptor file 520 to the translate/decode block 505 via the signal lines 507, 511. Thus, at the time the PUSH instruction is to be translated, the translate/decode logic concludes that the PUSH macro instruction should be translated into a micro instruction sequence to perform a 32-bit stack operation. But, during clock cycle 5, the processor 500 does not know whether the LSS macro instruction will load a descriptor which has the B-bit cleared (B=0) indicating that stack operations are to be 16-bit.

So, to insure that stack operations are always translated correctly, it is believed that prior art processors include a delay mechanism following changes to the SS segment register, which prevent translation of subsequent instructions until the new stack segment descriptor has been written into the descriptor file 520. Once the new descriptor has been written into the descriptor file 520, the contents of the stack address size define by the B bit can be provided to the translator. It is believed that one such delay mechanism is to simply place a sequence of no operation instructions (NOP's) at the end of every micro instruction sequence that modifies the stack segment register.

So, in clock cycle 5, rather than providing the first micro instruction in the PUSH sequence to the instruction register 510, the translator 506 provides a NOP, as part of the LSS micro instruction sequence. And, in the following 3 clock cycles, the LSS sequence proceeds through the pipeline stages, and NOP's are provided by the translator 506 to the instruction register 510. Finally, at the end of clock cycle 8, the last micro instruction for the LSS sequence passes through the write back stage, thereby completing the LSS operation. At this point, the contents of the descriptor file 520 reflect the new stack address size, as defined by the B bit of the descriptor, and these contents are forwarded to the translate/decode block, as described above. The PUSH macro instruction may now be translated correctly.

During clock cycle 9, the PUSH macro instruction is translated, and the first micro instruction in the sequence, PUSH-1, is provided to the instruction register 510. In subsequent clock cycles, the rest of the micro instructions in the PUSH sequence are translated, and provided to the pipeline for execution. These instructions proceed through the pipeline, and complete the PUSH operation at the end of clock cycle 15.

What should be apparent from the above is that a delay of at least four clock cycles has been created to insure that stack operations are translated correctly, following modifications to the stack segment register. This delay is undesirable, especially in instances where the contents of the B bit do not change (even if the descriptor changes), or where the instruction following a stack segment load is not a stack operation. For these instances, delays are imposed unnecessarily. In fact, the delays imposed are at least as long as the instruction which modifies the stack segment register.

Figure 7:
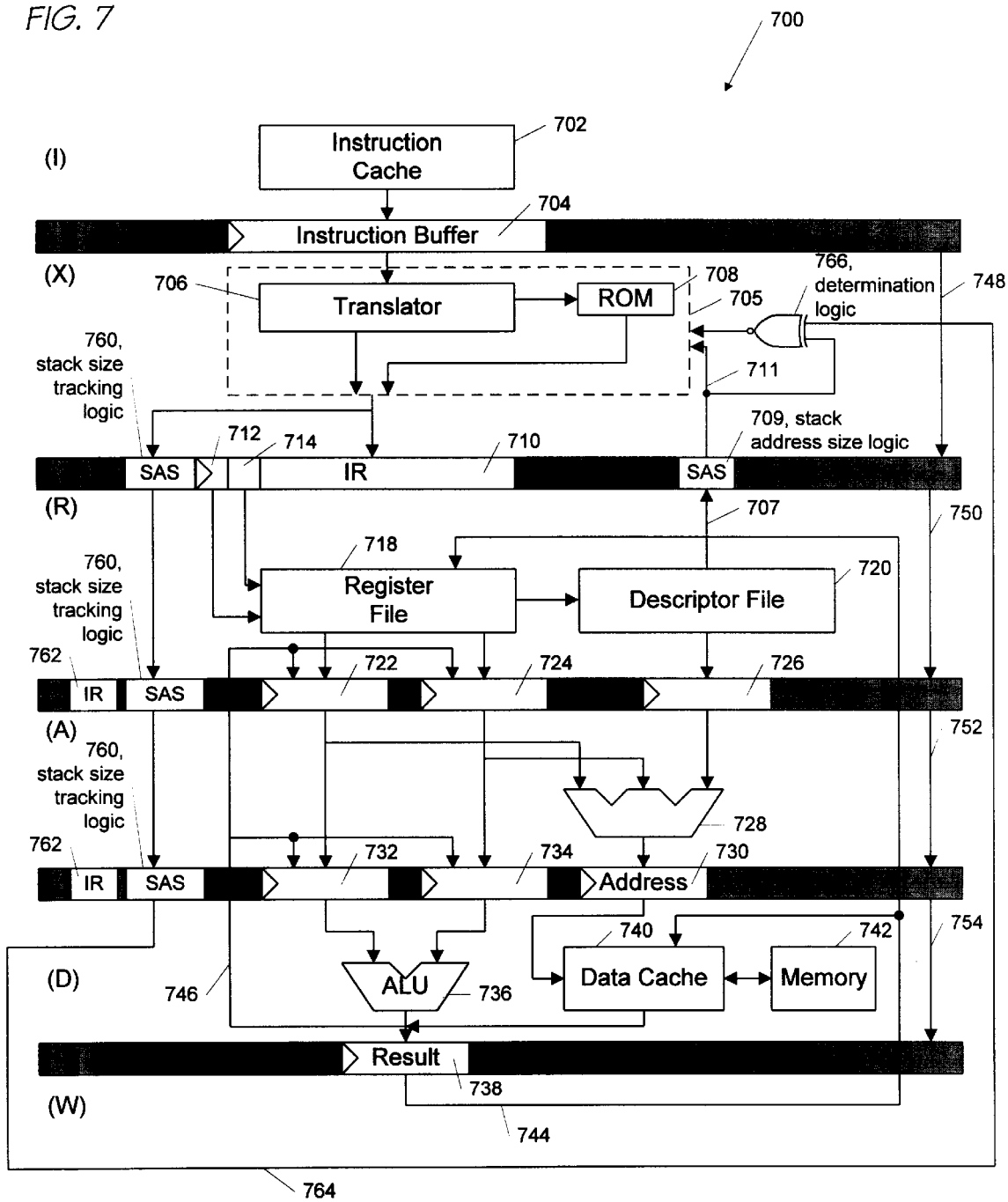
FIG. 7 is a block diagram of a pipeline processor that incorporates features of the present invention.

Now referring to FIG. 7, a mechanism according to the present invention will be shown, implemented within the pipeline processor discussed above with reference to FIG. 5. Like numerals refer to like elements, with the hundreds digit 5 replaced by a 7. The processor 700 further includes a plurality of SAS bits 760, within each stage of the processor 700. The SAS bits 760 allow the processor to track the status of the stack address size, at the time particular micro instructions are translated. The contents of the SAS bits 760 proceed through the pipeline, along with the micro instructions they are associated with, as implied by IR registers 762. Furthermore, the contents of the SAS bits 760 are provided as an input to a logic gate 766 via a signal line 764. In one embodiment, the logic gate 766 is an exclusive-or (XOR) gate. Another input to the logic gate 766 is the existing stack address size provided by the descriptor register file 720. Operation of this logic will now be shown, by reference to FIG. 8.

In FIG. 8, elements are similar to those of FIG. 6, with the number 8 replacing the number 6 in the hundreds digit of the designators. What is illustrated is the progression of an LSS instruction, followed by a PUSH instruction, through the pipeline processor shown in FIG. 7.

During clock cycles 1–4, execution is essentially the same as that described in FIG. 6. However, during clock cycle 5, another instruction is added to the LSS micro instruction sequence, and provided to the register stage. The instruction is JMP.SAS. This instruction tells the processor 700 to jump to the macro instruction pointed to by the instruction pointer, any time the inputs to the logic gate 766 are not the same. One skilled in the art will appreciate that the XOR gate 766 will provide a high output only when its inputs are different. When the inputs to the logic gate 766 are the same, its output will be low.

During clock cycle 6, the translator 706 translates the PUSH macro instruction, and provides the first micro instruction in the sequence to the instruction register. In addition, the translator 706 stores the value of the SAS, communicated by the descriptor file 720 at the time of translation, into SAS bit 760 associated with the instruction register 710.

During clock cycle 7, the PUSH-1 micro instruction proceeds through the register stage, along with its associated SAS bit 760. In addition, a PUSH-2 micro instruction is provided to the instruction register 710, and the value of SAS at the time of translation is stored in SAS bit 760.

During clock cycle 8, the PUSH-1 micro instruction proceeds through the address stage, along with its associated SAS bit 760, and the PUSH-2 micro instruction proceeds through the register stage, along with its associated SAS bit 760. Furthermore, a PUSH-3 micro instruction is provided to the instruction register 710, and the value of SAS at the time of translation is provided to the associated SAS bit 760.

At this point, the LSS-3 micro instruction is in the write-back stage of the processor 700, and the JMP.SAS micro instruction is in the data stage. By the end of clock cycle 8, the new contents of the SS segment register will have been loaded into the register file 718, and the descriptor file 720. The new value of the B bit will be known, and made available to the translate/decode block 705, and to the logic gate 766.

So, at the beginning of clock cycle 9, one of two scenarios will occur. Either, the JMP.SAS instruction will not cause a jump back to the PUSH macro instruction, or it will. Which of these two scenarios the processor 700 takes depends on whether the contents of the B-bit is changed by the LSS instruction. If the B bit does not change, then the SAS signal communicated to the logic gate 766 by the descriptor file will be the same as the contents of the SAS bits 760 associated with the PUSH micro instruction sequence. Since the inputs to the logic gate 766 are the same, the JMP.SAS micro instruction does not cause a jump operation, so the next instruction in the pipeline, PUSH-1, will proceed through the data stage, and complete execution, as will the rest of the micro instructions in the PUSH sequence.

If, however, the LSS macro instruction causes a change in the B bit of the SS segment descriptor, the inputs to the logic gate 766 will no longer be the same. The processor 700 detects this difference, and allows the JMP.SAS micro instruction to jump to the macro instruction still in the instruction buffer, i.e., PUSH. This instruction is now translated, according to the new stack address size, and proceeds through the pipeline stages.

To further illustrate the advantage of the present invention, a table below is provided which illustrates the number of clock cycles required to load a stack segment register, using the prior art method, and using the method and apparatus of the present invention.

TABLE I

| Method | No Change in B-bit (clock cycles) | Change in B-bit (clock cycles) |
|---|---|---|
| Prior art | 7 | 7 |
| SAS tracking | 3–5 | 8 |

In one embodiment, the 4 NOP's were replaced by an XOR gate, a plurality of SAS bits, and a jump micro instruction. Depending on how long it takes to execute the jump instruction (1 or 2 clock cycles), the LSS macro instruction can be improved by 29–42 percent in instances where no change is made to the B bit. And, one skilled in the art should appreciate that in the vast majority of stack segment loads, the B bit is not changed! In those ever rarer instances where the B bit is in fact changed, the mechanism of the present invention only affects the load operation by 12 percent.

Figure 9:
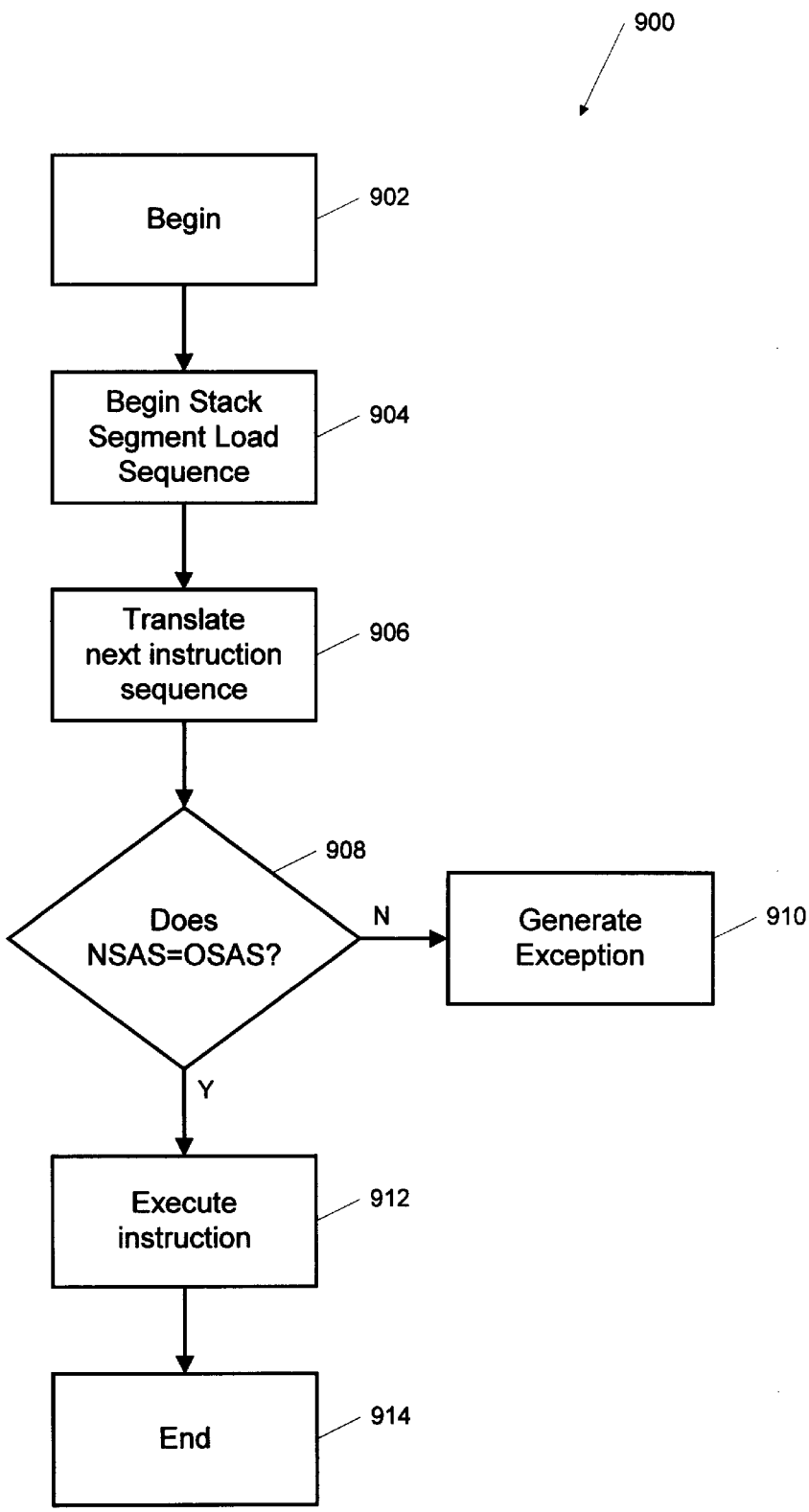
FIG. 9 is a flow chart illustrating micro instruction execution within the pipeline processor of FIG. 7 during and after the load of a stack segment register.

Now referring to FIG. 9, a flow chart 900 is provided which illustrates operation of an alternative embodiment of the present invention. The method illustrated in FIG. 9 is intended to operate within the processor 700.

Program flow begins at step 902 and proceeds to step 904 where the LSS micro instruction sequence is loaded and begins execution. Program flow then proceeds to step 906.

At step 906, the next instruction in the instruction buffer 904 is translated, and passed to the pipeline. Program flow then proceeds to step 908.

At step 908, a decision is made as to whether the inputs to the logic gate 766 are the same, i.e., is the new stack address size (NSAS) equal to the old stack address size (OSAS)? If so, instruction flow proceeds to block 912 where the instruction following LSS is executed. Program flow completes at step 914.

If the NSAS is not equal to the OSAS, an exception is generated by the logic gate 766. This causes the processor to branch to an exception routine, rather than executing the instructions in the pipeline. The exception routine determines that the B bit has changed, and causes the translator to retranslate the instruction following SAS.

By utilizing an exception routine, rather than a jump instruction, to correct program flow in instances where the B bit is modified, stack instructions may immediately follow stack segment register changes, without any delay.

Thus, by tracking the stack address size, at the time of translation, for micro instructions which follow stack segment load operations, delays typically associated with stack segment loads can be dramatically reduced, if not eliminated. In the vast majority of stack segment loads, the stack address size is not changed. The present invention therefore dramatically improves execution speed for stack segment load operations, without significantly affecting processing in those instances where the SAS is modified.

Although the present invention has been described in considerable detail with reference to certain preferred versions thereof, other versions are possible. For example, the mechanism shown with reference to FIG. 7 for tracking SAS status, and associating the SAS status with particular micro instructions, was simply an extra bit associated with the instruction register in each stage of the pipeline. This embodiment is one implementation only. It is in the mind of the inventor that other logic may be dedicated to tracking SAS changes, either for each micro instruction in a sequence, or for a particular macro instruction following a stack segment load operation. In addition, such tracking logic could cause an exception, as described with reference to FIG. 9, or could utilize other procedures for altering program flow. Furthermore, it is possible that in some complex processors, dual micro instruction sequences may be generated, one for 16-bit operations, one for 32-bit operations. When it is known whether a change has been made in the B bit, one of the paths may be selected.

An important aspect of the present invention is that delays typically associated with stack segment register instructions are removed, and instructions following such register instructions are translated immediately. In addition, a mechanism is provided which tracks whether a change is made to the stack address size, at least for interim instructions. If no change is made, the instructions following such register instructions are executed without delay. If a change in the stack address size is made, a mechanism or procedure exists to retranslate the instructions following the register instruction.

Although the present invention and its advantages have been described in detail, those skilled in the art should appreciate that they can readily use the disclosed conception and specific embodiments as a basis for designing or modifying other structures for carrying out the same purposes of the present invention. In addition, it should be understood that various changes, substitutions and alterations can be made herein without departing from the spirit and scope of the invention as defined by the appended claims.

We claim:

1. An apparatus for loading a stack segment register within a pipeline processor, the apparatus comprising:

a translator, within a translate stage of the pipeline processor, for translating a first macro instruction into a first sequence of micro instructions, and a second macro instruction into a second sequence of micro instructions;

a register file, connected to said translator, said register file further comprising a stack segment register, said stack segment register for storing a descriptor which indicates whether stack operations are of a first bit size or of a second bit size;

stack address size logic, connected to said register file, and to said translator, for providing an indicator to said translator that current stack operations are of said first bit size or of said second bit size;

stack size tracking logic, connected to said translator, and associated with said second sequence of micro instructions, following said first sequence of micro instructions in the pipeline processor, for tracking, in processing stages after said translate stage, whether stack operations were of said first bit size or of said second bit size at the time said second sequence of micro instructions were translated; and determination logic, connected to said stack size tracking logic, and to said stack address size logic, for determining whether said current stack operations and said tracked stack operations are both of said first bit size or of said second bit size, and if not of the same size, for providing a signal to the processor to ignore said second sequence of micro instructions, and to retranslate said second macro instruction using said indicator from said stack address size logic.

2. The apparatus for loading a stack segment register, as recited in claim 1, wherein said stack segment register is one of a plurality of segment registers within said register file.

3. The apparatus for loading a stack segment register, as recited in claim 2, wherein said stack segment register comprises a selector register and a descriptor register.

4. The apparatus for loading a stack segment register, as recited in claim 3, wherein said selector register is provided to temporarily store a 16-bit selector.

5. The apparatus for loading a stack segment register, as recited in claim 3, wherein said descriptor register is provided to temporarily store said descriptor.

6. The apparatus for loading a stack segment register, as recited in claim 5, wherein said descriptor is 64-bits.

7. The apparatus for loading a stack segment register, as recited in claim 6, wherein one of said 64-bits is used to indicate whether stack operations are of said first bit size or of said second bit size.

8. The apparatus for loading a stack segment register, as recited in claim 7, wherein said one of said 64-bits is called the B bit within data segments.

9. The apparatus for loading a stack segment register, as recited in claim 8, wherein if said B bit is 1, then stack operations use said first bit size for a stack pointer register.

10. The apparatus for loading a stack segment register, as recited in claim 8, wherein if said B bit is 0, then stack operations use said second bit size for a stack pointer register.

11. The apparatus for loading a stack segment register, as recited in claim 7, wherein said stack address size logic further comprises an SAS signal line, proceeding from said register file, and connected to said translator, for transmitting the value of said one of said 64-bits, to indicate whether stack operations are of said first bit size or of said second bit size.

12. The apparatus for loading a stack segment register, as recited in claim 11, wherein said translator utilizes the value transmitted by said SAS signal line when translating said second macro instruction.

13. The apparatus for loading a stack segment register, as recited in claim 12, wherein said translator, when translating stack macro instructions, utilizes a stack pointer register of said first bit size if said SAS signal line is high, and a stack pointer register of said second bit size if said SAS signal line is low.

14. The apparatus for loading a stack segment register, as recited in claim 1, wherein said first bit size is 32-bits and said second bit size is 16-bits.

15. The apparatus for loading a stack segment register, as recited in claim 1, wherein said translator further comprises a control ROM.

16. The apparatus for loading a stack segment register, as recited in claim 1, wherein said stack size tracking logic comprises a plurality of SAS bits, each of said SAS bits associated with one of said processing stages after said translate stage, each of said plurality of SAS bits indicating whether the micro instruction within its associated processing stage was translated when stack operations were of said first bit size or of said second bit size.

17. The apparatus for loading a stack segment register, as recited in claim 1, wherein said second sequence of micro instructions comprises:
 a first micro instruction; and
 a second micro instruction; and
 wherein said stack size tracking logic comprises a first bit, associated with said first micro instruction; and
 a second bit, associated with said second micro instruction;
 said first and second bits for indicating whether stack operations were of said first bit size or said second bit size, at the time said translator translated said first and second micro instructions, respectively.

18. The apparatus for loading a stack segment register, as recited in claim 1, wherein said determination logic comprises an exclusive-or (XOR) gate, whose first input is connected to said stack address size logic, and whose second input is connected to said stack size tracking logic, and whose output is connected to said translator.

19. The apparatus for loading a stack segment register, as recited in claim 18, wherein when said first and said second inputs are not the same, the processor does not continue processing said second sequence of micro instructions, but retranslates said second sequence of micro instructions.

20. The apparatus for loading a stack segment register, as recited in claim 1, further comprising:
 a jump micro instruction, provided by said translator after said first sequence of micro instructions and before said second sequence of micro instructions, said jump micro instruction, causing the processor to conditionally jump back to said second macro instruction when said determination logic determines that said current stack operations and said tracked stack operations are not of the same size.

21. A tracking mechanism, within a pipeline microprocessor, utilized for micro instructions that follow a stack segment register load, the tracking mechanism comprising:
 a plurality of pipeline stages within the pipeline microprocessor, wherein one of said plurality of pipeline stages comprises a translate stage for translating macro instructions into micro instruction sequences;
 a stack address size signal line, for transmitting an indicator signal to said translate stage, from a source thereof, which indicates whether stack operations are to utilize a 16-bit or a 32-bit stack address size (SAS);
 a plurality of instruction registers, each one of said plurality of instruction registers connected to one of said plurality of pipeline stages such that each one of said plurality of pipeline stages has an associated one of said plurality of instruction registers, said plurality of instruction registers for temporarily storing micro instructions as they proceed through the pipeline microprocessor;
 a plurality of stack address size bits, each one of said plurality of stack address size bits connected to one of said plurality of pipeline stages, and associated with one of said plurality of instruction registers, each one of said plurality of stack address size bits for temporarily storing the value of said SAS indicator at the time the micro instruction in said associated instruction register was translated; and
 logic circuitry, connected to said stack address signal line, and to at least one of said plurality of stack address size bits, for determining whether said SAS indicator, stored in said at least one of said plurality of address size bits, is the same as said SAS signal on said stack address signal line, and for providing a signal to the pipeline microprocessor to continue processing micro instructions within said plurality of pipeline stages, or to discontinue processing said micro instructions within said plurality of pipeline stages, and to retranslate said micro instructions whose associated stack address size bit is not the same as said SAS signal on said stack address signal line.

22. The tracking mechanism, as recited in claim 21, wherein said tracking mechanism monitors the stack address size that is currently applicable, as well as what the stack address size was, at the time of translation, for micro instructions that follow the stack segment register load.

23. The tracking mechanism, as recited in claim 21, wherein said plurality of pipeline stages further comprise:
   a register stage, connected to said translate stage, for retrieving operands associated with micro instructions;
   an address stage, connected to said translate stage, for calculating memory addresses;
   a data stage, connected to said address stage, for performing arithmetic and logic operations; and
   a write back stage, connected to said data stage, for writing results provided by said data stage into either a memory, or a register file within said register stage.

24. The tracking mechanism, as recited in claim 23, wherein a first one of said plurality of instruction registers, and a first one of said plurality of stack address size bits, is connected to said register stage, a second one of said plurality of instruction registers, and a second one of said plurality of stack address size bits, is connected to said address stage, and a third one of said plurality of instruction registers, and a third one of said plurality of stack address bits, is connected to said data stage.

25. The tracking mechanism, as recited in claim 21, wherein the stack segment register load loads a stack segment register with a selector, and a descriptor that defines the stack segment.

26. The tracking mechanism, as recited in claim 25, wherein said descriptor includes a B-bit which indicates, for data segments, the size of stack operations.

27. The tracking mechanism, as recited in claim 26, wherein said stack operations are 32-bit when said B-bit equals 1, and 16-bit when said B-bit equals 0.

28. The tracking mechanism, as recited in claim 26, wherein said B-bit is the source of said indicator signal transmitted by said stack address size signal line.

29. The tracking mechanism, as recited in claim 21, wherein said logic circuitry comprises an exclusive-or (XOR) gate whose inputs are connected to said SAS signal line, and at least one of said plurality of stack address size bits, and whose output controls whether micro instructions following said stack segment register load will be executed or ignored.

30. A method for loading a stack segment register within a pipeline microprocessor, the method comprising the steps of:
   providing a stack address size (SAS) signal which indicates the current bit size for stack operations;
   translating a load stack segment macro instruction into a first sequence of micro instructions;
   providing the first sequence of micro instructions to pipeline stages within the pipeline microprocessor;
   translating a second macro instruction into a second sequence of micro instructions;
   storing a stack address size (SAS) indicator along with at least one of the micro instructions within the second sequence, the indicator indicating the bit size for stack operations at the time the second macro instruction was translated;
   monitoring the SAS signal, and the SAS indicator, to determine whether, prior to executing the at least one of the micro instructions within the second sequence, the bit size for stack operations has changed since the at least one of the micro instructions within the second sequence was translated; and
   if, prior to executing the at least one of the micro instructions within the second sequence, the bit size for stack operations has changed, then disabling execution of the micro instructions within the second sequence, and retranslating the second macro instruction.

31. The method for loading a stack segment register, as recited in claim 30, wherein the stack segment register defines the memory segment for stack operations.

32. The method for loading a stack segment register, as recited in claim 30, wherein stack operations include pushes, pops and calls.

33. The method for loading a stack segment register, as recited in claim 30, wherein the current bit size for stack operations is either 16-bit or 32-bit.

34. The method for loading a stack segment register, as recited in claim 30, wherein said step of providing a stack address size (SAS) signal further comprises the steps of:
   determining the current bit size for stack operations from a stack segment descriptor; and
   transmitting the SAS signal to a translator within the pipeline microprocessor.

35. The method for loading a stack segment register, as recited in claim 30, wherein said step of translating is performed by a translator within a translate/decode stage of the pipeline microprocessor.

36. The method for loading a stack segment register, as recited in claim 30, wherein the micro instructions in the first sequence are provided to the pipeline stages, one at a time, but sequentially.

37. The method for loading a stack segment register, as recited in claim 30, wherein the second sequence of micro instructions immediately follows the first sequence of micro instructions in the pipeline stages within the pipeline microprocessor.

38. The method for loading a stack segment register, as recited in claim 30, wherein said step of storing an SAS indicator stores the indicator along with at least two of the micro instructions within the second sequence.

39. The method for loading a stack segment register, as recited in claim 38, wherein the SAS indicator is stored within a single bit field connected to an instruction register which stores the micro instructions within the second micro instruction sequence, one at a time.

40. The method for loading a stack segment register, as recited in claim 38, wherein the stored SAS indicator is termed the "old SAS".

41. The method for loading a stack segment register, as recited in claim 40, wherein the SAS signal is termed the "new SAS".

42. The method for loading a stack segment register, as recited in claim 41, wherein said step of monitoring compares the "old SAS" and the "new SAS" to determine if the bit size for stack operations has changed since translation of the second sequence of micro instructions.

* * * * *